United States Patent
Mason

(10) Patent No.: US 6,869,260 B1
(45) Date of Patent: Mar. 22, 2005

(54) ANCHORAGES

(75) Inventor: Stuart Leslie Mason, Somerset (GB)

(73) Assignee: C. N. Unwin Limited, Somerset (GB)

( * ) Notice: Subject to any disclaimer, the term of this patent is extended or adjusted under 35 U.S.C. 154(b) by 197 days.

(21) Appl. No.: 10/111,286

(22) PCT Filed: Oct. 20, 2000

(86) PCT No.: PCT/GB00/04053

§ 371 (c)(1),
(2), (4) Date: Apr. 22, 2002

(87) PCT Pub. No.: WO01/28811

PCT Pub. Date: Apr. 26, 2001

(30) Foreign Application Priority Data

Oct. 21, 1999 (GB) .............................. 9924801
Sep. 13, 2000 (GB) .............................. 0022379

(51) Int. Cl.$^7$ ............................................ B61D 45/00
(52) U.S. Cl. .......................... 410/111; 410/116; 410/23
(58) Field of Search .......................... 410/7, 4, 10, 11, 410/23, 106, 107, 110, 111, 116; 24/115 K, 265 CD; 248/499

(56) References Cited

U.S. PATENT DOCUMENTS 2,614,871 A * 10/1952 Grizzard et al.
2,664,611 A * 1/1954 Shomber
2,786,428 A    3/1957 Arnold
3,275,284 A * 9/1966 Gary
3,365,162 A * 1/1968 Davis
3,524,413 A * 8/1970 Veasman ..................... 105/369
3,878,589 A * 4/1975 Schaefer ..................... 248/223
3,917,213 A * 11/1975 Poehlmann ................. 248/509
5,409,335 A    4/1995 Beck

FOREIGN PATENT DOCUMENTS

| | | | |
|---|---|---|---|
| DE | 75 21 530 | 1/1976 | |
| GB | 1188285 | 4/1970 | |
| GB | 2 276 658 | 10/1994 | |
| GB | 2 301 858 | 12/1996 | |
| JP | 360131338 | * 7/1985 | ................. 410/107 |
| JP | 360131339 | * 7/1985 | ................. 410/107 |

* cited by examiner

*Primary Examiner*—D. Glenn Dayoan
*Assistant Examiner*—H. Gutman
(74) *Attorney, Agent, or Firm*—Young & Thompson

(57) ABSTRACT

An anchorage has two members, one fixed the other at the end of a strap or other element to be secured, which hook together and which can then be manipulated so that there is virtually no chance of separation, particularly when there is a pull on the strap. One member, usually the fixed one, may be a stud of mushroom form while the other may be a D-shaped plate with the curved periphery extended out of the plane of the plate to form a U-shaped channel that can hook onto the head of the stud. But formations on the head and on the plate, or a wall around the stud, allows full engagement only in one direction, while after that mutual rotation through at least 90° makes the hooked member captive to the stud. The stud may be biased by its weight or a spring so that its head is normally lowered against the mouth of a socket, but is shaped so that it can be wedged up by the hook member as that is offered up.

13 Claims, 4 Drawing Sheets

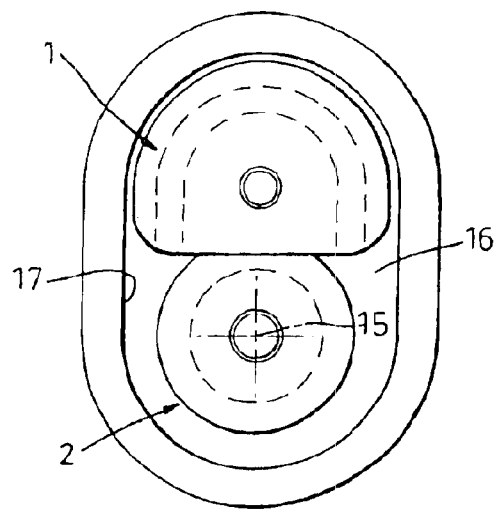
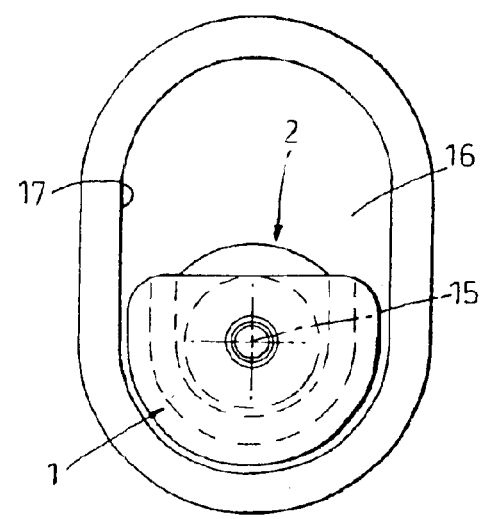
Fig. 6  Fig. 7
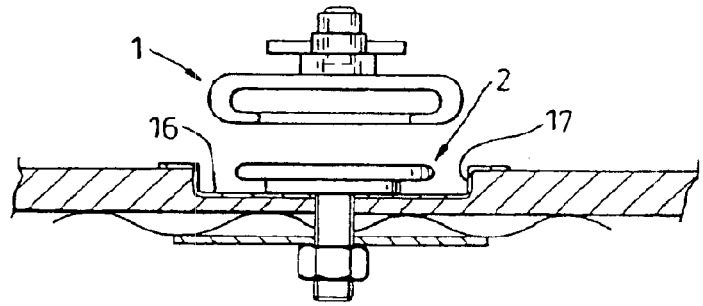
Fig. 8
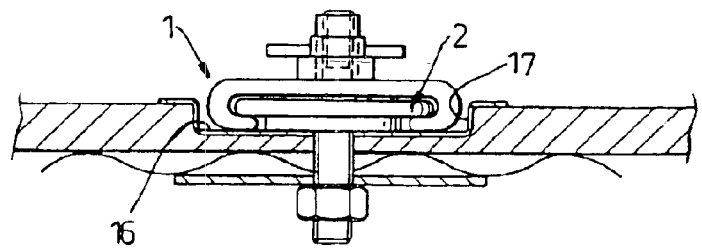
Fig. 9

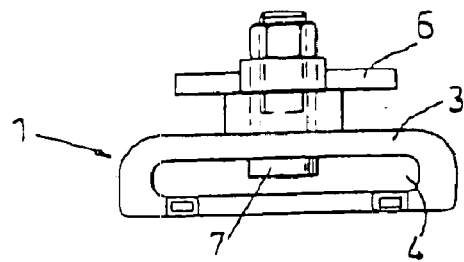
*Fig. 14*
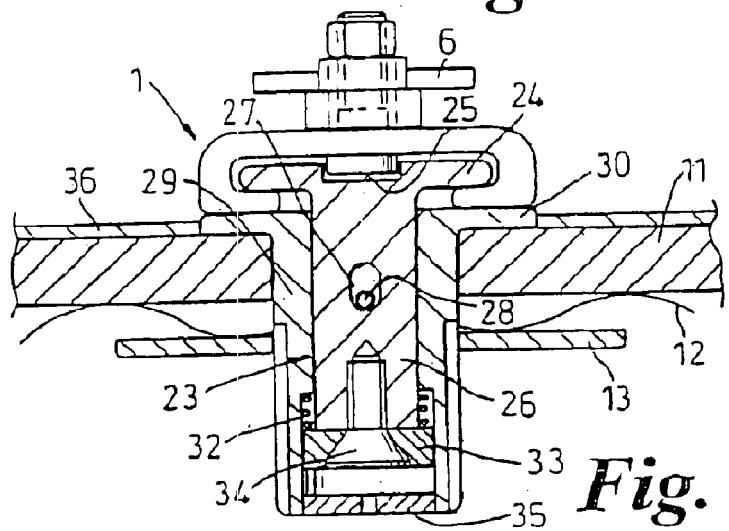
*Fig. 15*
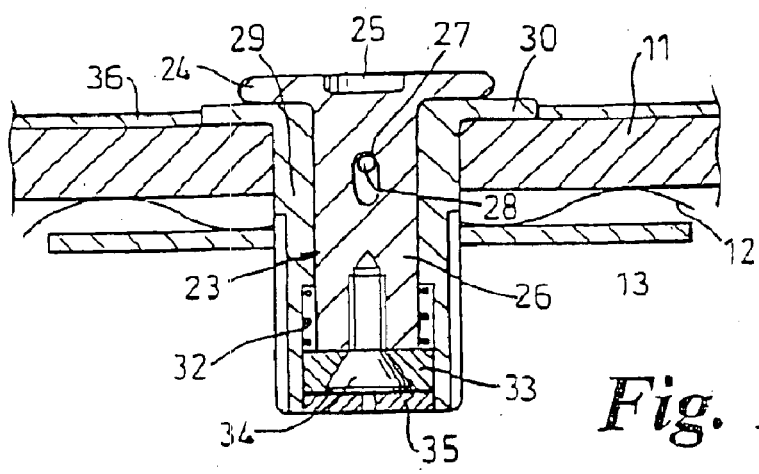
*Fig. 16*

ANCHORAGES

CROSS REFERENCE TO RELATED APPLICATION

This is the 35 USC 371 national stage of international application PCT/GB00/04053 filed on Oct. 20, 2000, which designated the United States of America.

FIELD OF THE INVENTION

This invention relates to anchorages. It is primarily concerned with the securing of wheelchairs in vehicles, which have to be held fast to the vehicle body, usually by straps to fittings on the floor. But it could have other applications and it will be understood that other flexible members than straps could be equipped with such an anchorage. It would also be possible to use them with rigid members, such as chair legs.

BACKGROUND OF THE INVENTION

It is important that not only should the anchorage be secure but also it should be quick and easy to engage and disengage. Such ease tends to be counter to security. For example, while a hook is quick and easy to attach, and is very secure as long as tension is applied, should there be any slackening, it can come free. It is the aim of this invention to have a hook type engagement where such release is virtually impossible.

SUMMARY OF THE INVENTION

According to the present invention there is provided an anchorage comprising two interengageable members, one being adapted for the attachment of an element to be secured, a first member having a mushroom-shaped formation and a second member having a generally U-shaped channel open inwards of the U for receiving part of the rim of the mushroom head when that is moved radially into the mouth of the U, this movement being possible only when the first member has a first orientation about its axis with respect to the second member, the members when engaged being mutually rotatable about said axis to a second orientation in which separation in any radial direction is obstructed by the mutual co operation of said members.

While this may suggest that the first member is movable while the second member is fixed, it will be understood that the reverse arrangement is equally possible.

In one embodiment the second member has a projection co-axial with the axis of the semi-circular end of the U-shaped channel, and the mushroom head has a radial groove along which the projection moves during engagement of said members, the mutual rotation to the second orientation trapping the projection in the groove. In this case, the first member may be adapted to be fixed to a solid base so that a mushroom stud projects therefrom.

Alternatively, the second member is adapted to be recessed into a solid base, being elongate D-shaped with the U-shaped channel formed by an inturned flange around the rim at one end. This can be flush with the base so there is no hazardous projection.

In another embodiment which can avoid projections the first member has a wall eccentrically surrounding the mushroom-shaped formation, and the second member can be offered up to the first member within said wall. When there has been full engagement and rotation to the second orientation, mutual detachment of said members is prevented by the wall. The mushroom-shaped formation can be upstanding from the base of a dish adapted to be recessed into a solid base and which provides said wall.

But these too have a disadvantage in that the dishes can accumulate foreign matter unless kept carefully covered, and so in a preferred embodiment, the first member comprises a socket adapted to be fitted into a base and a mushroom stud with limited axial movement between retracted and extended positions and whose stem is received in the socket. The head of the stud when retracted is flush with or marginally proud of the base in which the socket is fitted. But when the stud is extended, the head is non-rotatable and is spaced from the base to accept engagement by the second member.

Preferably, the stud is spring biased towards the retracted position although it would be possible in some circumstances just to rely on its weight to cause retraction. The ends of the U-shaped channel may be adapted to wedge under the rim of the head of the stud as the second member is offered up to the first member, thereby to move the head from the retracted to the extended position.

Alternatively the stud may be retainable by catch means in the retracted position and be spring biased to move to the extended position when the catch means is released. In this case the stud, when urged to the retracted position, may be rotatable to a captive condition, as in a bayonet type fitting for example.

While the most common usage of this anchorage may be for holding articles down to a floor, it can equally well be applied to walls, bulkheads, roofs or ceilings.

BRIEF DESCRIPTION OF THE DRAWINGS

For a better understanding of the invention, some embodiments will now be described, by way of example, with reference to the accompanying drawings, in which:

FIG. 6 is a plan view of another vehicle floor fitting with a hook member offered up for engagement, FIG. 7 is a similar plan view showing full engagement, FIG. 8 is a vertical section through the floor fitting with the hook member preparatory to engagement, FIG. 9 is a similar section with the hook member engaged, completing another anchorage, FIG. 14 is an end view of a hook member for another floor stud, FIG. 15 is a vertical section through the floor of a vehicle fitted with a retractable stud engaged by the hook member of FIG. 14, and FIG. 16 is a section similar to FIG. 15 with the hook member removed.

DETAILED DESCRIPTION OF THE INVENTION

Figure 1:
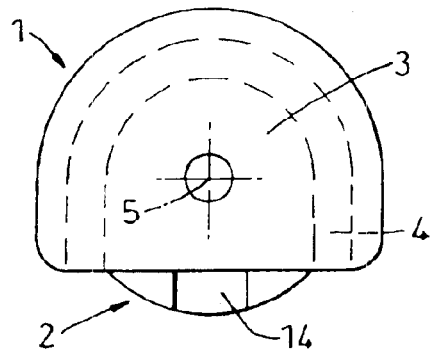
FIG. 1 is a simplified plan view of a hook member to be attached to a strap, also showing part of a stud to which it is engaged.
Figure 3:
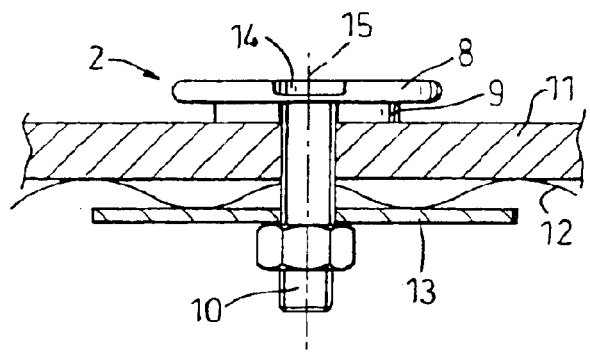
FIG. 3 is a vertical section through the floor of a vehicle fitted with the stud with which the hook member can engage.
Figure 2:
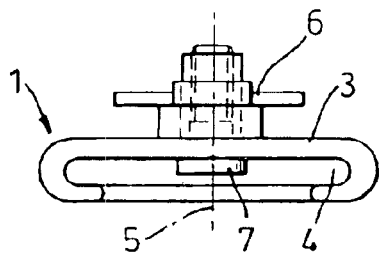
FIG. 2 is an end view of the hook member of FIG. 1.
Figure 4:
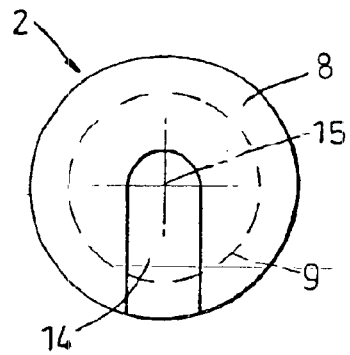
FIG. 4 is a plan view of the stud of FIG. 3.
Figure 5:
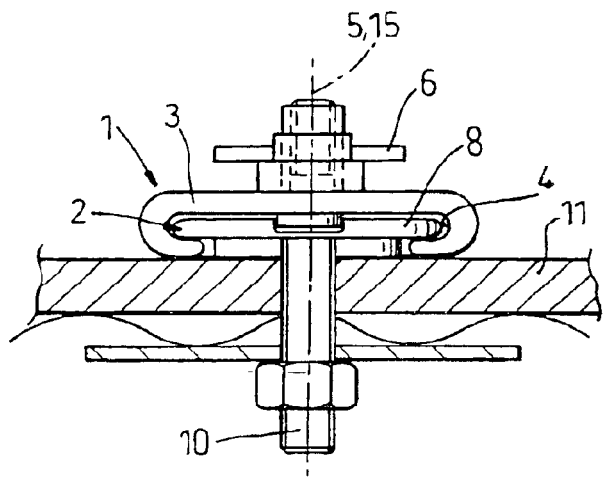
FIG. 5 is a section similar to FIG. 3 showing the hook member engaged, completing an anchorage.
Figure 10:
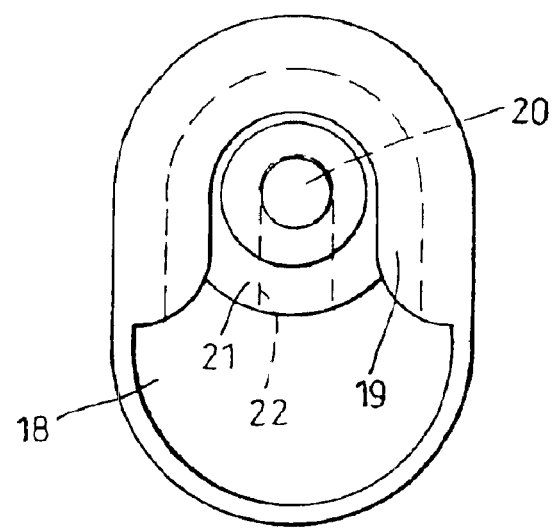
FIG. 10 is a plan view of a further anchorage.
Figure 11:
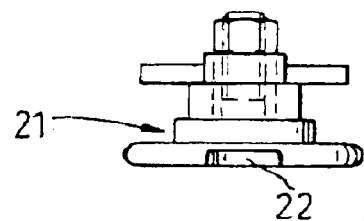
FIG. 11 is an end view of a member forming part of the anchorage of FIG. 10.
Figure 12:
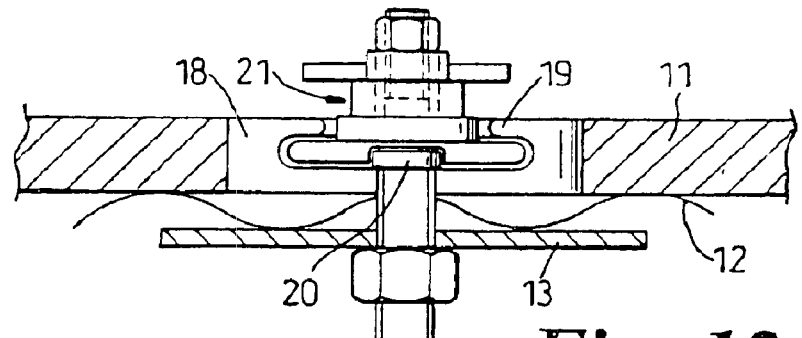
FIG. 12 is a vertical section through the floor of a vehicle fitted with a hooked pocket engaged by the member of FIG. 11.
Figure 13:
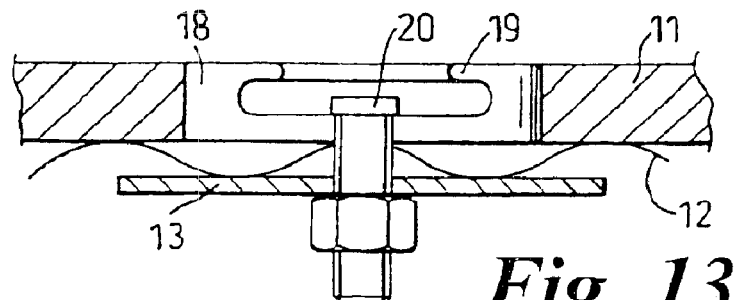
FIG. 13 is a section similar to FIG. 12 with the member removed.

The anchorage of FIGS. 1 to 5 comprises a hook member 1 and a floor stud 2. The member 1 has a D-shaped plate 3 whose curved edge is bent down and inwardly to form an inwardly open channel 4 U-shaped in plan whose curved portion is semi-circular and centred on an axis 5. The ends of the channel are straight and parallel. On top of this plate 3 there is mounted a fitting 6 (not shown in FIG. 1) to which a strap (also not shown) can be attached. The fitting is secured by a bolt whose head 7 projects below the plate 3 to about half the vertical depth of the channel 4.

The floor stud 2 is of wide shallow mushroom shape with a head 8 projecting radially further than its stem 9. It is secured to the floor by a co-axial bolt 10, the floor in this example comprising a plywood surface layer 11 over corrugated sheet metal 12. The load is spread by a plate or large washer 13. In the top of the head 8 there is a shallow radial groove 14 with a rounded blind end centred on the axis 15 of the stud.

For mutual attachment, the hook member 1 is offered up straight edge of the D-shaped plate 3 leading, towards the open end of the groove 14. As it is pushed horizontally, the bolt head 7 enters this groove, while the rim of the head 8 enters the channel 4. When the axes 5 and 15 are coincident, the member 1 is rotated, through 90° or more. FIG. 1 shows 180° rotation with the intended main pull on the member 1 generally in the direction from the closed to the open end of the groove 14. With this rotation of 180°, the member 1 is securely trapped. It cannot escape in the original direction of engagement since the head 7 is now blocked by the blind end of the groove 14. The pull in the opposite direction, and indeed in wide arcs to either side, is of course resisted by the engagement of the head 8 in the channel 4, and this is secure even when there is a substantial component of vertical pull as well.

Thus, even if the strap is slackened, the anchorage will not come apart and it requires further rotation through 180° to allow that.

However, twisting the hook member through 180° may be awkward with the strap attached, and it has been found that a 90° turn is generally quite sufficient for a secure anchorage.

To protect the plywood 11, a metal plate (not shown) may be sandwiched between the stem 9 and the plywood and extend radially beyond the stud, particularly opposite the open end of the groove 14 where it can provide an apron from which the hook member 1 can approach the stud.

It will be understood that it would be possible to swap the groove 14 and the projection 7, having the latter on the stud 2 and the groove in the member 1. But this is not favoured since it increases the height of the stud.

Indeed it is not always desirable to have even a shallow stud upstanding from the floor. The embodiment of FIGS. 6 to 9 enables the stud 2 to be sunk within the thickness of the floor. Here, although it is referenced as previously, it is within a pocket 16 of shallow dish form set into a recess in the floor, and it does not have the radial groove 14. In plan view, this pocket is rectangular with semi-circular ends. The axis 15 of the stud is co-axial with one of those ends.

The hook member 1 which engages this is the same as with the previous embodiment except that the head 7 is countersunk within the thickness of the plate 3 and does not project. The member 1 is offered up as shown in FIG. 6 to occupy the end of the pocket 16 without the stud 2, and with its curved outer periphery close against the wall 17 of the pocket. The member 1 is then moved horizontally so that it engages over the stud, capturing the rim of the head 8 in the channel 4. Then the member 1 is rotated through 180° to reach the position of FIG. 7, thereby becoming securely trapped. It cannot move in many directions because of the close proximity of its outer periphery with the semicircular end and it cannot move in the other directions (including the direction of pull), because of the hooked engagement.

An alternative is indicated diagrammatically in FIGS. 10 to 13. Again, there is a pocket 18 similar in profile to the pocket 16 but having at one end an in-turned flange 19 over the semi-circle and a bit beyond. A shallow stud 20, co-axial with that semi-circular end, is upstanding from the floor of the pocket 18. A fitting 21 to engage with this is an inverted mushroom shaped member to whose stem the strap will be attached. It has a radial groove 22 similar to the groove 14. It is first offered up head downwards into the end of the pocket without the flange 19 and then moved horizontally so that the stud 20 enters the groove 22 and the rim of the member 21 engages under the flange 19. The member 21 will then be rotated through 180° to the position of FIG. 10, and again the anchorage will be secure.

Covers can be provided for the pockets 16 and 18, to be fitted when they are not in use and might otherwise collect dirt and debris.

As an alternative to recessing a fixed stud into the floor, it is possible to have a stud that will be of very low profile when not in use, but which can be raised and operate in the manner of the stud of FIGS. 1 to 5. This is shown in FIGS. 14, 15 and 16, where the same references are used to indicate parts equivalent to those of previous figures. In particular, the hook member 1 is essentially the same as before except that at the ends of the channel 4, the ends of the underlying flange are wedge shaped, with the upper surface sloping down to the lower one.

The floor stud 23 is again generally mushroom shaped with a head 24 similar to that of the stud 2, and having a shallow radial groove 25. Its stem 26 is more substantial and a short distance below the head 24 it has a diametral slot 27, the major axis of the cross-section of the slot being vertical. Through this slot extends a pin 28 which spans the interior of a guide sleeve 29 having an outward radial flange 30 that bears on top of the plywood 11. A nut 31 threads on to the lower end of the sleeve and will be tightened up against the washer 13 to clamp this sleeve 29 in place. Internally, the sleeve steps outwardly towards its lower end to provide a seat for a helical spring 32 surrounding the stem 26. The lower end of the spring bears against the periphery of a squat cylindrical base 33 held by a screw 34 to the lower end of the stem 26. Thus, normally, the stud 23 is urged downwardly to a retracted position so that the head 24 bears on the flange 30. The extreme lower end of the sleeve 29 is substantially closed by a disc 35.

The plywood floor 11 is shown here covered by a thin layer 36, such as carpet, tiles or sheet material, and the flange 30 is set down into this so that it is only marginally proud, while the head 24 has a low profile above that.

When the stud is required for use, the hook member 11 is offered up as before and slid horizontally to capture the head 24. The wedged ends of the U-shaped channel meet the head 24 first and cause the stud to be eased up to an extended position, and then full engagement is achieved as shown in FIG. 15. The rotation to the positively retained condition is as described above.

Since the weight of the stud will naturally cause it to seat as in FIG. 16, the spring 32 need only exert a light force.

Indeed, in an economy version for floor use it might be omitted and reliance placed on weight alone. The pin 28 and slot 27 limit the upward movement of the stud and prevent the stud rotating, so keeping the radial groove 25 correctly oriented.

For the hook member to wedge up the stud, the latter must necessarily have its head proud of the floor. As described, the head can be shallow and therefore not present much of an obstruction. However, there may be circumstances where even this is undesirable.

There are various ways of providing a pop-up stud that can be retracted against a spring to a completely flush position. For example, the apron onto which the hook member is laid before engagement could have a flush press button or sliding catch which could engage or disengage the stud. Alternatively the stud itself, when pressed down and turned so that its radial groove was not open to the approach of the hook member, could be retained in that retracted position in the manner of a bayonet fitting. The hook member might be provided with a formation to fit the groove so that it could be used as a screwdriver to rotate the stud when retracted and allow it to pop up, and to restore it to the retracted position. Once raised the stud would not be rotatable.

While reference has mostly been made to strap anchorages, it will be understood that "strap" is shorthand in this specification for any flexible elongate elements, including ropes, wires and chains.

It would also be possible to use the anchorage for rigid elements such as a chair leg. For example, the member 1 could be fitted as a rotatable foot at the bottom of the leg, and the chair would first be slid over the floor to engage the stud 2 and then the foot member 1 would be turned. All the chair legs could be so fitted, but it may be sufficient to have two rotatable feet and two fixed ones that simply hook under floor studs.

What is claimed is:

1. An anchorage comprising two interengageable members, one being adapted for the attachment of an element to be secured; a first member having a first axis and a mushroom head with a rim; and a second member having a generally U-shaped channel defining an open mouth for receiving part of the rim of the mushroom head when said rim is subjected to a radial movement into the mouth of the U-shaped channel; said movement being possible only when the first member has a first orientation about the first axis with respect to the second member; said members when engaged being mutually rotatable about said first axis to a second orientation in which separation in any radial direction is obstructed by the mutual co-operation of said members; said second member having a projection co-axial with the axis of the semi-circular end of the U-shaped channel; and said mushroom head having a radial groove along which the projection moves during engagement of said members, the mutual rotation to the second orientation trapping the projection in the groove.

2. The anchorage as claimed in claim 1, wherein the first member is adapted to be fixed to a solid base.

3. The anchorage as claimed in claim 1, wherein the first member comprises a socket adapted to be fitted into a base and a mushroom stud with limited axial movement between retracted and extended positions; said stud having a head, and a stem which is received in the socket; said head of the stud, when retracted, being flush with or marginally proud of the base in which the socket is fitted, and said head of the stud, when extended, being non-rotatable and spaced from the base to accept engagement by the second member.

4. The anchorage as claimed in claim 3, wherein the stud is spring biased towards the retracted position.

5. The anchorage as claimed in claim 3, wherein the ends of the U-shaped channel are adapted to wedge under the rim of the head of the stud as the second member is offered up to the first member, thereby to move the head from the retracted to the extended position.

6. The anchorage as claimed in claim 3, wherein the stud is retainable by catch means in the retracted position, and is spring biased to move to the extended position when the catch means is released.

7. The anchorage as claimed in claim 6, wherein the stud, when urged to the retracted position, is rotatable to a captive condition.

8. An anchorage comprising two interengageable members, one being adapted for the attachment of an element to be secured; a first member having a first axis and a mushroom head with a rim; and a second member having a generally U-shaped channel defining an open mouth for receiving part of the rim of the mushroom head when said rim is subjected to a radial movement into the mouth of the U-shaped channel; said movement being possible only when the first member has a first orientation about the first axis with respect to the second member; said members when engaged being mutually rotatable about said first axis to a second orientation in which separation in any radial direction is obstructed by the mutual co-operation of said members; said first member comprising a socket adapted to be fitted into a base and a mushroom stud with limited axial movement between retracted and extended positions; said stud having a head, and a stem which is received in the socket; said head of the stud, when retracted, being flush with or marginally proud of the base in which the socket is fitted, and said head of the stud, when extended, being non-rotatable and spaced from the base to accept engagement by the second member.

9. The anchorage as claimed in claim 8, wherein the stud is spring biased towards the retracted position.

10. The anchorage as claimed in claim 8, wherein the ends of the U-shaped channel are adapted to wedge under the rim of the head of the stud as the second member is offered up to the first member, thereby to move the head from the retracted to the extended position.

11. The anchorage as claimed in claim 9, wherein the ends of the U-shaped channel are adapted to wedge under the rim of the head of the stud as the second member is offered up to the first member, thereby to move the head from the retracted to the extended position.

12. The anchorage as claimed in claim 8, wherein the stud is retainable by catch means in the retracted position, and is spring biased to move to the extended position when the catch means is released.

13. The anchorage as claimed in claim 12, wherein the stud, when urged to the retracted position, is rotatable to a captive condition.

* * * * *